US007119713B2

(12) United States Patent
Shuey et al.

(10) Patent No.: US 7,119,713 B2
(45) Date of Patent: Oct. 10, 2006

(54) DYNAMIC SELF-CONFIGURING METERING NETWORK

(75) Inventors: Kenneth C. Shuey, Zebulon, NC (US); Rodney C. Hemminger, Raleigh, NC (US); Robert T. Mason, Jr., Raleigh, NC (US); Eugene W. Hodges, Holly Springs, NC (US)

(73) Assignee: Elster Electricity, LLC, Raleigh, NC (US)

( * ) Notice: Subject to any disclaimer, the term of this patent is extended or adjusted under 35 U.S.C. 154(b) by 525 days.

(21) Appl. No.: 10/185,664

(22) Filed: Jun. 27, 2002

(65) Prior Publication Data

US 2004/0001008 A1   Jan. 1, 2004

(51) Int. Cl.
G08C 17/00   (2006.01)

(52) U.S. Cl. ............................ 340/870.02; 340/870.01; 340/870.06

(58) Field of Classification Search ........... 340/870.02, 340/10.41, 3.51, 870.01, 870.03, 870.16; 702/62

See application file for complete search history.

(56) References Cited

U.S. PATENT DOCUMENTS

| 3,445,815 A | 5/1969 | Saltzberg et al. ........... 340/163 |
| 3,858,212 A | 12/1974 | Tompkins et al. ..... 343/100 CS |
| 3,878,512 A | 4/1975 | Kobayashi et al. ...... 340/168 R |
| 3,973,240 A | 8/1976 | Fong .......................... 340/151 |
| 4,031,513 A | 6/1977 | Simciak .................. 340/152 T |
| 4,056,107 A | 11/1977 | Todd et al. ................ 130/27 R |
| 4,132,981 A | 1/1979 | White ........................ 340/203 |
| 4,190,800 A | 2/1980 | Kelly, Jr. et al. ............. 325/37 |
| 4,204,195 A | 5/1980 | Bogacki ..................... 340/151 |
| 4,218,737 A | 8/1980 | Buscher et al. ............. 364/493 |
| 4,250,489 A | 2/1981 | Dudash et al. ........... 340/147 T |
| 4,254,472 A | 3/1981 | Juengel et al. .............. 364/900 |
| 4,319,358 A | 3/1982 | Sepp ............................. 375/1 |
| 4,321,582 A | 3/1982 | Banghart ................ 340/310 R |
| 4,361,890 A | 11/1982 | Green, Jr. et al. ............... 375/1 |
| 4,405,829 A | 9/1983 | Rivest et al. ............ 178/22.14 |
| 4,415,896 A | 11/1983 | Allgood .................. 340/870.03 |
| 4,466,001 A | 8/1984 | Moore et al. .......... 340/825.08 |
| 4,504,831 A | 3/1985 | Jahr et al. .............. 340/870.03 |
| 4,506,386 A | 3/1985 | Ichikawa et al. ........... 455/343 |
| 4,525,861 A | 6/1985 | Freeburg ..................... 455/33 |
| 4,600,923 A | 7/1986 | Hicks et al. ........... 340/870.02 |
| 4,608,699 A | 8/1986 | Batlivala et al. ............ 375/216 |

(Continued)

FOREIGN PATENT DOCUMENTS

EP   0 395 495 A1   10/1990

(Continued)

OTHER PUBLICATIONS

Desbonnet, J. et al., "System Architecture and Implementation of a CEBus/Internet Gateway," *IEEE Transactions on Consumer Electronics*, 1997, 43(4), pp. 1057-1062.

(Continued)

*Primary Examiner*—Wendy R. Garber
*Assistant Examiner*—Hung Q. Dang
(74) *Attorney, Agent, or Firm*—Woodcock Washburn LLP

(57) ABSTRACT

A dynamic self-configuring system for collecting metering data comprises a collector meter. The collector meter scans for meters that are operable to directly communicate with the collector and registers such meters as level one meters. The collector transmits instructions to the level one meters to scan for meters that are operable to directly communicate with the level one meters. The collector registers meters that respond as level two meters.

25 Claims, 10 Drawing Sheets

U.S. PATENT DOCUMENTS

| | | | |
|---|---|---|---|
| 4,611,333 A | 9/1986 | McCallister et al. | 375/1 |
| 4,614,945 A | 9/1986 | Brunius et al. | 340/870.02 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 A |
| 4,653,076 A | 3/1987 | Jerrim et al. | 375/115 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825.01 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrikson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Blum | 379/106 |
| 5,475,867 A | 12/1995 | Gilbert | 455/53.1 |
| 5,479,442 A | 12/1995 | Yamamoto | 375/206 |
| 5,481,259 A | 1/1996 | Bane | 340/870.03 |
| 5,488,608 A | 1/1996 | Flammer, III | 370/85.13 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,521,910 A | 5/1996 | Matthews | 370/54 |
| 5,522,044 A | 5/1996 | Pascucci et al. | 395/200.06 |
| 5,525,898 A | 6/1996 | Lee, Jr. et al. | 324/142 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,570,084 A | 10/1996 | Ritter et al. | 340/825.05 |
| 5,572,438 A | 11/1996 | Ehlers et al. | 364/492 |
| 5,590,179 A | 12/1996 | Shincovich et al. | 379/107 |

| | | | | | |
|---|---|---|---|---|---|
| 5,592,470 A | 1/1997 | Rudrapatna et al. ........ 370/320 | 6,249,516 B1 | 6/2001 | Brownrigg et al. ......... 370/338 |
| 5,594,740 A | 1/1997 | LaDue ........................ 379/59 | 6,373,399 B1 | 4/2002 | Johnson et al. ........ 340/870.11 |
| 5,602,744 A | 2/1997 | Meek et al. ........... 364/464.22 | 6,393,341 B1 | 5/2002 | Lawrence et al. .......... 700/286 |
| 5,617,084 A * | 4/1997 | Sears .................... 340/870.11 | 6,421,731 B1 | 7/2002 | Ciotti, Jr. et al. ........... 709/238 |
| 5,619,192 A | 4/1997 | Ayala .................... 340/870.02 | 6,657,549 B1 * | 12/2003 | Avery .................... 340/825.49 |
| 5,619,685 A | 4/1997 | Schiavone .................. 395/500 | 2002/0026957 A1 * | 3/2002 | Reyman ...................... 137/39 |
| 5,621,629 A | 4/1997 | Hemminger et al. .......... 363/56 | 2002/0145537 A1 | 10/2002 | Mueller et al. ........ 340/870.02 |
| 5,627,759 A | 5/1997 | Bearden et al. ............. 364/483 | 2003/0202512 A1 | 10/2003 | Kennedy .................... 370/389 |
| 5,631,636 A | 5/1997 | Bane ..................... 340/825.69 | 2004/0113810 A1 | 6/2004 | Mason, Jr. et al. ..... 340/870.02 |
| 5,636,216 A | 6/1997 | Fox et al. .................... 370/402 | | | |
| 5,640,679 A | 6/1997 | Lundqvist et al. ......... 455/33.2 | | FOREIGN PATENT DOCUMENTS | |
| 5,659,300 A | 8/1997 | Dresselhuys et al. ... 340/870.02 | | | |
| 5,684,472 A | 11/1997 | Bane ..................... 340/870.02 | EP | 0 446 979 A1 | 9/1991 |
| 5,684,799 A | 11/1997 | Bigham et al. ............. 370/397 | EP | 0 629 098 A2 | 12/1994 |
| 5,691,715 A | 11/1997 | Ouellette ............... 340/870.09 | GB | 2 118 340 A | 10/1983 |
| 5,692,180 A | 11/1997 | Lee ............................. 395/610 | GB | 2 157 448 A | 10/1985 |
| 5,696,501 A | 12/1997 | Ouellette et al. ...... 340/870.02 | GB | 2 186 404 A | 8/1987 |
| 5,696,765 A | 12/1997 | Safadi ........................ 370/436 | GB | 2 222 898 A1 | 3/1990 |
| 5,699,276 A | 12/1997 | Roos ..................... 364/514 A | GB | 2 237 910 A | 5/1991 |
| 5,715,390 A | 2/1998 | Hoffman et al. ....... 395/188.01 | JP | 59-229949 | 12/1984 |
| 5,717,604 A | 2/1998 | Wiggins .................. 364/514 C | JP | 02-67967 A | 3/1990 |
| 5,732,078 A | 3/1998 | Arango ....................... 370/355 | JP | 4290593 A | 10/1992 |
| 5,745,901 A | 4/1998 | Entner et al. ............... 707/103 | JP | 05-260569 | 10/1993 |
| 5,748,104 A | 5/1998 | Argyroudis et al. ... 340/870.11 | JP | 8194023 A | 7/1996 |
| 5,748,619 A | 5/1998 | Meier ........................ 370/278 | WO | 93/02515 A1 | 2/1993 |
| 5,751,914 A | 5/1998 | Coley et al. .................. 395/51 | WO | 93/04451 A1 | 3/1993 |
| 5,751,961 A | 5/1998 | Smyk .................... 395/200.47 | WO | 95/32595 A1 | 11/1995 |
| 5,754,772 A | 5/1998 | Leaf ...................... 395/200.33 | WO | 96/10856 A1 | 4/1996 |
| 5,754,830 A | 5/1998 | Butts et al. .................. 395/500 | | | |
| 5,757,783 A | 5/1998 | Eng et al. ................... 370/315 | | OTHER PUBLICATIONS | |
| 5,778,368 A | 7/1998 | Hogan et al. ................. 707/10 | | | |
| 5,787,437 A | 7/1998 | Potterveld et al. .......... 707/103 | | | |
| 5,790,789 A | 8/1998 | Suarez .................. 395/200.32 | | | |
| 5,790,809 A | 8/1998 | Holmes ................. 395/200.58 | | | |
| 5,805,712 A | 9/1998 | Davis ........................... 380/50 | | | |
| 5,808,558 A | 9/1998 | Meek et al. ........... 340/870.01 | | | |
| 5,822,521 A | 10/1998 | Gartner et al. ........... 395/200.6 | | | |
| 5,862,391 A | 1/1999 | Salas et al. ............. 395/750.01 | | | |
| 5,872,774 A | 2/1999 | Wheatley, III et al. ...... 370/335 | | | |
| 5,874,903 A | 2/1999 | Shuey et al. ........... 340/870.02 | | | |
| 5,875,183 A | 2/1999 | Nitadori ...................... 370/328 | | | |
| 5,875,402 A | 2/1999 | Yamawaki .................. 455/502 | | | |
| 5,897,607 A | 4/1999 | Jenney et al. ................. 702/62 | | | |
| 5,898,387 A | 4/1999 | Davis et al. ........... 340/870.02 | | | |
| 5,907,491 A | 5/1999 | Canada et al. ......... 364/468.15 | | | |
| 5,907,540 A | 5/1999 | Hayashi ...................... 370/315 | | | |
| 5,910,799 A | 6/1999 | Carpenter et al. .......... 345/333 | | | |
| 5,943,375 A | 8/1999 | Veintimilla .................. 375/355 | | | |
| 5,953,319 A | 9/1999 | Dutta et al. .................. 370/238 | | | |
| 5,960,074 A | 9/1999 | Clark .......................... 379/310 | | | |
| 5,963,146 A | 10/1999 | Johnson et al. ........ 340/870.01 | | | |
| 5,974,236 A | 10/1999 | Sherman ............... 395/200.51 | | | |
| 5,986,574 A | 11/1999 | Colton .................. 340/870.02 | | | |
| 6,000,034 A | 12/1999 | Lightbody et al. .......... 713/202 | | | |
| 6,041,056 A | 3/2000 | Bigham et al. ............. 370/395 | | | |
| 6,067,029 A | 5/2000 | Durston ................. 340/870.03 | | | |
| 6,073,169 A | 6/2000 | Shuey et al. ................ 709/217 | | | |
| 6,073,174 A | 6/2000 | Montgomerie et al. ..... 709/224 | | | |
| 6,078,251 A | 6/2000 | Landt et al. ............. 340/10.41 | | | |
| 6,078,785 A | 6/2000 | Bush ............................. 455/7 | | | |
| 6,078,909 A | 6/2000 | Knutson ...................... 705/59 | | | |
| 6,088,659 A | 7/2000 | Kelley et al. ................. 702/62 | | | |
| 6,100,817 A | 8/2000 | Mason, Jr. et al. ..... 340/870.02 | | | |
| 6,112,192 A | 8/2000 | Capek .......................... 705/59 | | | |
| 6,124,806 A | 9/2000 | Cunningham et al. . 340/870.02 | | | |
| 6,150,955 A | 11/2000 | Tracy et al. ........... 340/870.02 | | | |
| 6,160,993 A | 12/2000 | Wilson ...................... 455/12.1 | | | |
| 6,172,616 B1 | 1/2001 | Johnson et al. ........ 340/870.12 | | | |
| 6,195,018 B1 | 2/2001 | Ragle et al. ........... 340/870.01 | | | |
| 6,199,068 B1 | 3/2001 | Carpenter .................. 707/100 | | | |
| 6,246,677 B1 | 6/2001 | Nap et al. .................... 370/346 | | | |

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com, BellSouth Wireless Data—Paging, Mobitex, Network, Business, Sep. 23, 1998: -Mobitex®: The Heart of Every BellSouth Solution, -Mobitex Features and Services: RAM Mobile Data White Paper, Feb. 1997, -Narrowband PCS Technologies: What are the Options?: RAM Mobile Data White Paper, Nov. 1997, -The Inherent Security of Data Over Mobitex Wireless Packet Data Networks, A RAM Mobile Data White Paper, Oct. 1995, -Comparative Analysis of Coverage and Performance: RAM & Ardis, 1998.

Internet Printout, http://www.ardis.com, "Ardis Two-Way, Wireless Data Communications," Ardis, Sep. 23, 1998.

Internet Printout, http://www.ardis.com/RADIO, "An Overview of Radio Coverage," Sep. 29, 1998, "Radio Propagation," Sep. 29, 1998, "Factors Affecting Ardis Coverage," Sep. 29, 1998, "The Ardis Network Compared to Other Systems," Sep. 29, 1998.

Internet Printout, http://www.ardis.com/RADIO, "Radio Coverage," Sep. 29, 1998, "Glossary of Terms," Sep. 29, 1998, "Radio Propagation in Free Space," Sep. 29, 1998, "Real World Propagation Variations," Sep. 29, 1998, "Probability of Reception vs. Calculation," Sep. 29, 1998.

Markwalter, B. E. et al., "CEBus Network Layer Description," *IEEE Transactions on Consumer Electronics*, Aug. 1989, 35(3), 571-576.

"MV-90 Read Only System" UTS Software Solutions For Utility Customers. (No Date). (No Page Numbers or Pages).

Newton, H., *Newton's Telecom Dictionary*, CMP Books, 17th Ed., 2001, pp. LAN (p. 394); CEBUS (p. 134).

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", *International Conference on Consumer Electronics*, Jun. 5-7, 1996, 236-237, XP-002218722.

Corcoran, P.M. et al., "Browser-Style Interfaces to a Home Automation Network", *IEEE Trans. On Consumer Electronics*, Nov. 1, 1997, 43(4), 1063-1069, XP-000768559.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN, The National Research and Education Network*, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Johnson, D.B., "Routing in Ad Hoc Networks of Mobile Hosts", *IEEE*, 1995, 158-163.

Jubin, J., "Current Packet Radio Networks Protocols", *IEEE Infocom Proceedings*, 1985, 86-92.

Jubin, J. et al., "The DARPA Packet Radio Network Protocols", *Proceedings of the IEEE*, 1987, 75(1), 21-32.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

* cited by examiner

DYNAMIC SELF-CONFIGURING METERING NETWORK

CROSS REFERENCE TO RELATED APPLICATIONS

This application is related by subject matter to U.S. patent application Ser. No. 10/185,074, filed Jun. 28, 2002, and entitled "Data Collector for an Automated Meter Reading System," the contents of which are hereby incorporated by reference in their entirety.

FIELD OF THE INVENTION

The present invention relates to metering systems, and more particularly, to wireless networks for gathering metering data.

BACKGROUND

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation. Thus, while existing fixed wireless systems have reduced the need for human involvement in the daily collection of meter data, such systems require substantial human investment in planning, installation, and maintenance and are relatively inflexible and difficult to manage.

SUMMARY

A dynamic self-configuring system for collecting meter data is disclosed herein. In an illustrative embodiment, a plurality of meter devices, which operate to track usage of a service or commodity such as, for example, electricity, water, and gas, are operable to wirelessly communicate. One of the meter devices, which is referred to as a collector, broadcasts messages to identify one or more of the meters with which it can directly communicate. The meters with which the collector is operable to directly communicate may be referred to as level one meters. Data designating these meters as level one meters is stored on the collector and the level one meters.

The collector communicates instructions to the level one meters to scan for meters that are operable to directly communicate with the level one meters. Meters that directly communicate with the level one meters may be referred to as level two meters. Data identifying the level two meters and the communication path to the level two meters is stored on the collector and the level two meters.

The collector continues the process of scanning the last defined level of meters for new meters that communicate with the last defined level. This process gradually provides identification of the meters in the network and the paths by which to communicate with each meter. Additionally, when new meters are added to the network, they are identified via subsequent scans.

BRIEF DESCRIPTION OF THE DRAWINGS

Other features of systems and methods for gathering metering data are further apparent from the following detailed description of exemplary embodiments taken in conjunction with the accompanying drawings, of which.

DETAILED DESCRIPTION

Exemplary systems and methods for gathering meter data are described below with reference to FIGS. 1–9. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector meter is operable to automatically identify and register meters for communication with the collector meter. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
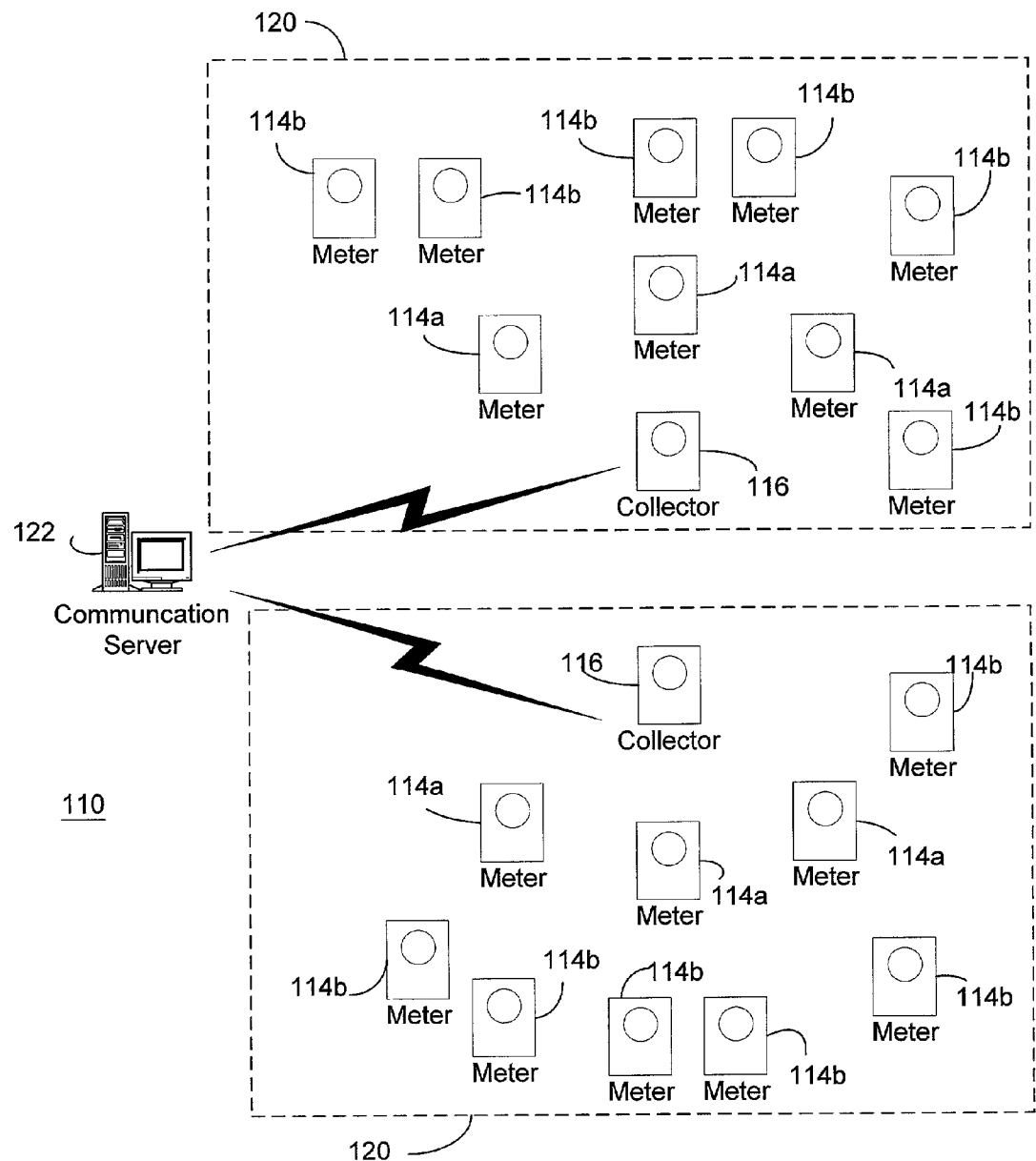
FIG. 1 is a diagram of a wireless system for collecting meter data.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by ABB Incorporated.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by ABB Incorporated.

A collector 116 and the meters 114 for which it is configured to receive meter data define a subnet 120 of system 110. For each subnet 120, data is collected at collector 116 and periodically transmitted to communication server 122. Communication server 122 stores the data for analysis and preparation of bills. Communication server 122 may be a specially programmed general purpose computing system and may communicate with collectors 116 wirelessly or via a wire line connection such as, for example, a dial-up telephone connection or fixed wire network.

Thus, each subnet 120 comprises a collector 116 and one or more meters 114, which may be referred to as nodes of the subnet. Typically, collector 116 directly communicates with only a subset of the plurality of meters 114 in the particular subnet. Meters 114 with which collector 116 directly communicates may be referred to as level one meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a directly communicates with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 114, first level 114a, second level 114b) in FIG. 1, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 512 meters might be registered with a single collector 116.

Each meter 114 and collector 116 that is installed in the system 110 has a unique identifier stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter with which the meter communicates to send and receive data to the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated with each node.

Generally, collector 116 and meters 114 communicate with and amongst one another using any one of several robust wireless techniques such as, for example, frequency hopping spread spectrum (FHSS) and direct sequence spread spectrum (DSSS).

For most network tasks such as, for example, reading data, collector 116 communicates with meters 114 in the subnet 120 using point-to-point transmissions. For example, a message or instruction from collector 116 is routed through a defined set of meter hops to the desired meter 114. Similarly, a meter 114 communicates with collector 117 through the same set of meter hops, but in reverse.

In some instances, however, collector 117 needs to quickly communicate information to all meters 114 located in its subnet 120. Accordingly, collector 117 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates out the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from communication server 122; an immediate exception, which is generally relayed to communication server 122 under an expedited schedule; and a daily exception, which is communicated to the communication server 122 on a regular schedule.

Figure 2:
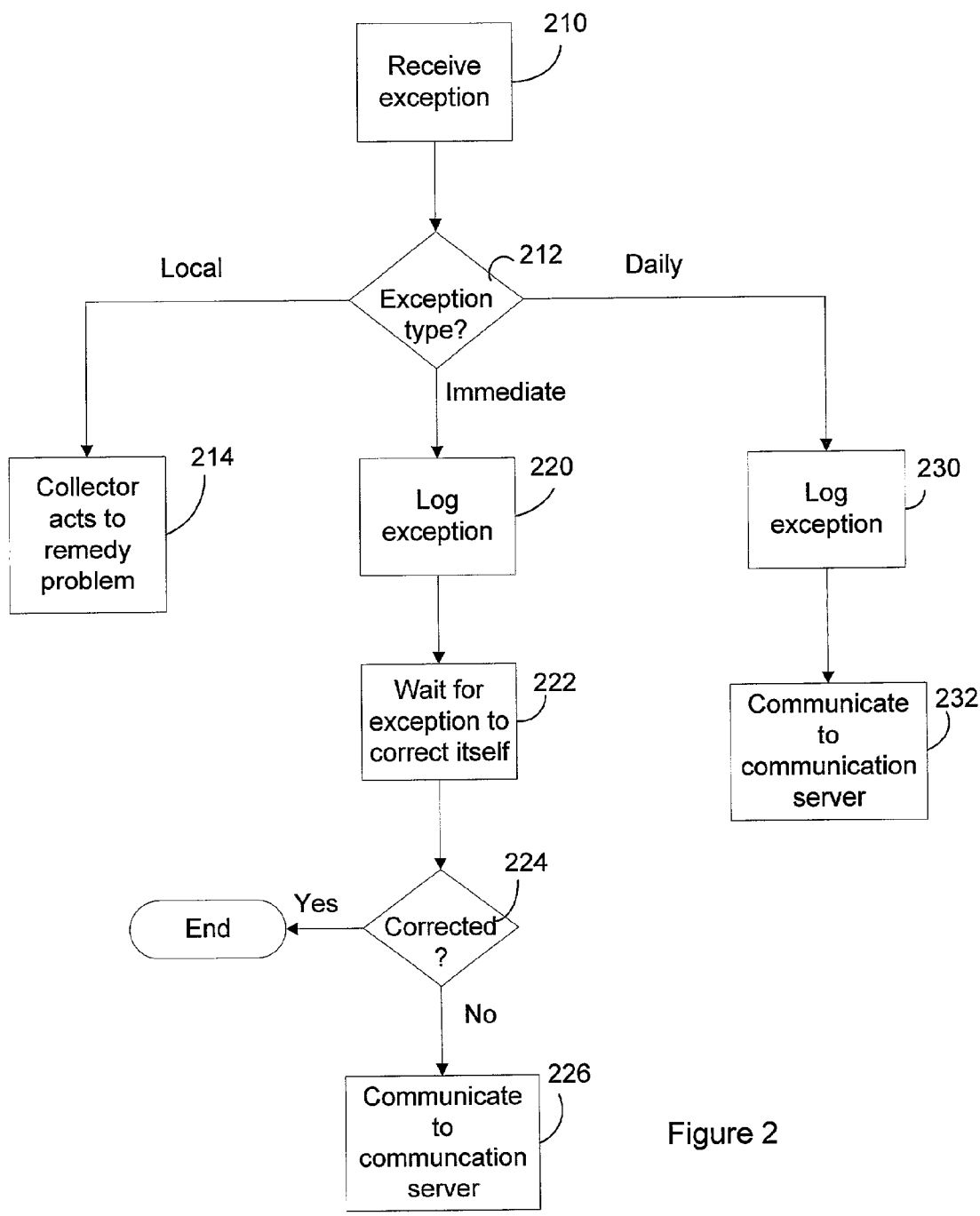
FIG. 2 depicts a flow chart of a process for exception handling.

FIG. 2 presents a flowchart of a process employed by collector 116 for handling these exceptions. At step 210, the exception is received at collector 116. At step 212, collector 116 identifies the type of exception that has been received. If a local exception has been received, at step 214, collector 116 takes an action to remedy the problem. For example, when collector 116 receives an exception requesting a node scan request such as discussed below, collector 116 transmits a command to initiate a scan procedure to the meter 114 from which the exception was received.

If an immediate exception type has been received, at step 220, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table."

At step 222, collector 116 waits a set period of time before taking further action with respect to the immediate exception. For example, collector 116 may wait 64 seconds. This delay period allows the exception to be corrected before communicating the exception to communication server 122. For example, where a power outage was the cause of the immediate exception, collector 116 may wait a set period of time to allow for receipt of a message indicating the power outage has been corrected.

If at step 224 the exception has not been corrected, at step 226, collector 116 communicates the immediate exception to communication server 122. For example, collector 116 may initiate a dial-up connection with communication server 122 and download the exception data. After reporting an immediate exception to communications server 122, collector 116 may delay reporting any additional immediate exceptions for a period of time such as ten minutes. This is to avoid reporting exceptions from other meters 114 that relate to, or have the same cause as the exception that was just reported.

If a daily exception was received, at step 230, the exception is recorded in a file or a database table. Generally, daily exceptions are occurrences in the subnet 120 that need to be reported to communication server 122, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." At step 232, collector 116 communicates the daily exceptions to communications server 122. Generally, collector 116 communicates the daily exceptions once every 24 hours.

According to an aspect of the disclosed system 110, a collector 116 may dynamically identify meters 114 that are operable to communicate with it in a subnet 120 as well as identify more efficient communication paths for previously registered meters. For example, when a collector 116 is initially brought into system 110, it needs to identify and register meters in its subnet 120. A "node scan" refers to a process of communication between connectors 116 and meters 114 whereby a collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

Figure 3A:
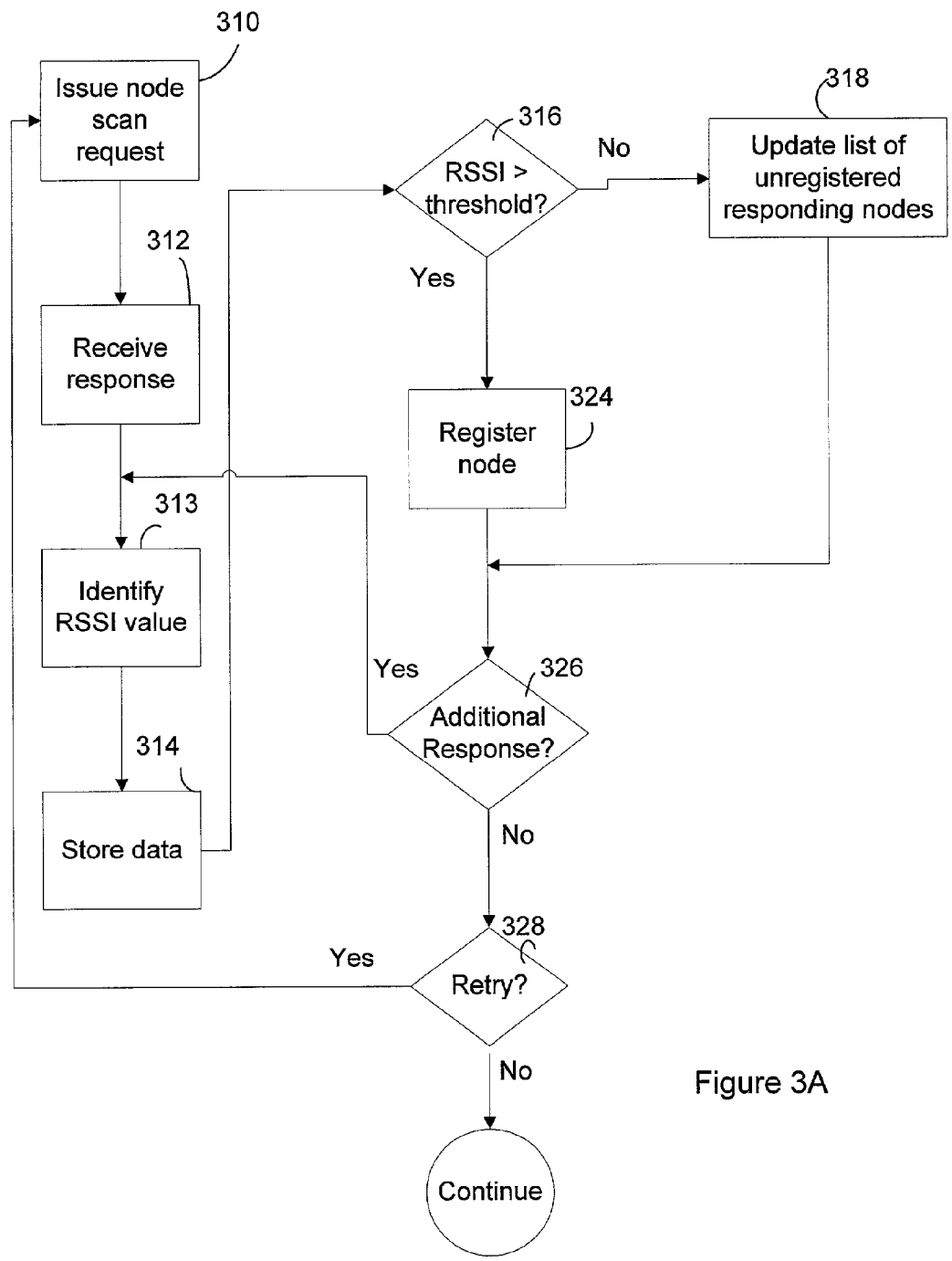
FIGS. 3A and 3B depicts a flow chart of a process for registering nodes with a collector.
Figure 3B:
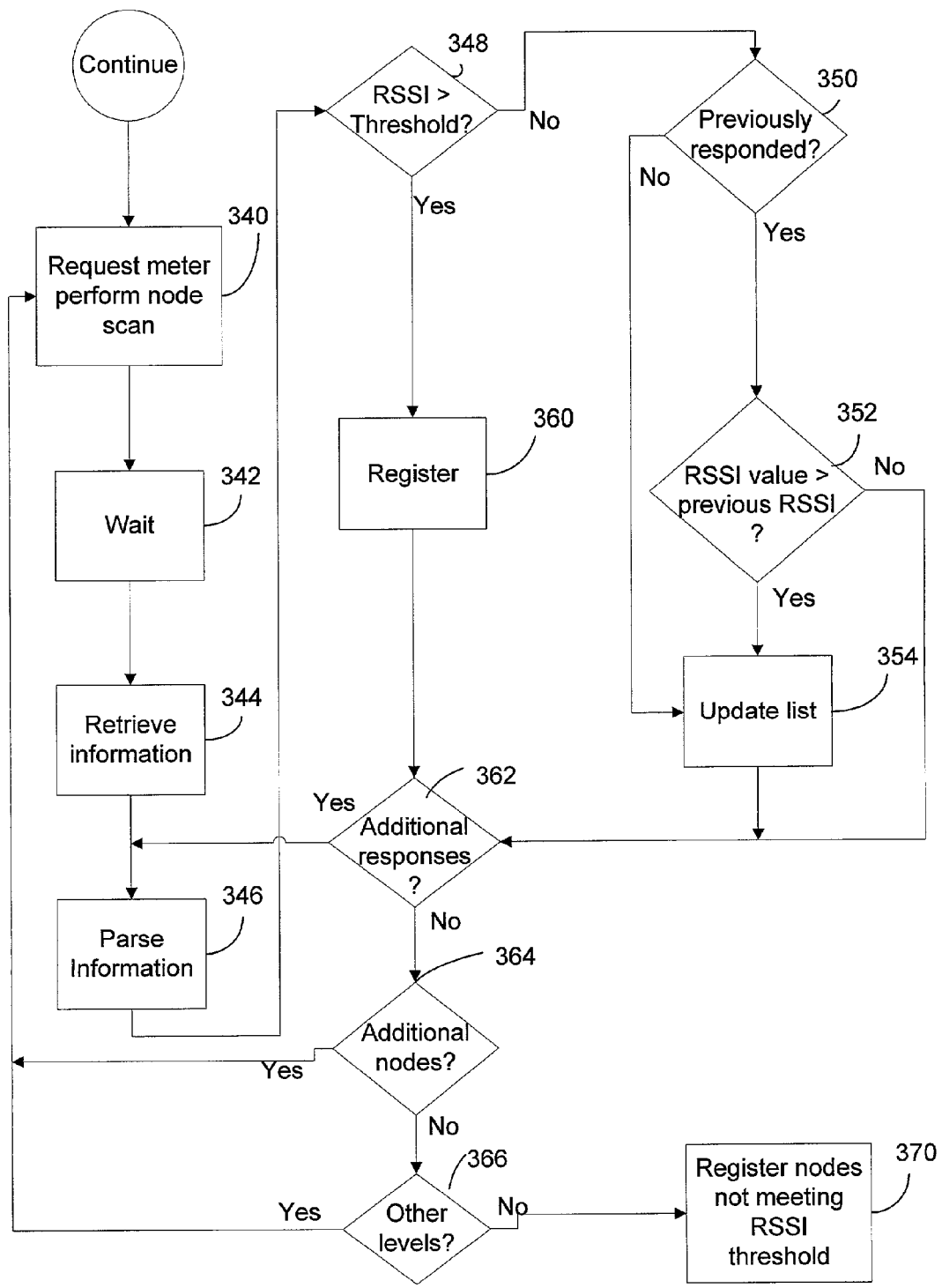

A full node scan may be performed, for example, when a collector is first installed. The collector 116 must identify and register nodes from which it will collect usage data. FIGS. 3A and 3B depict a flow chart of a process for performing a "full node scan." As shown, at step 310, the collector 116 initiates the node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected at meters 114 that are in proximity of collector 116. Meters 114 that receive the Node Scan Procedure request respond by transmitting their unique identifier as well as other data.

Collector 116 receives a response from one of the meters 114 at step 312. At step 313, collector 116 identifies a received signal strength (RSSI) value for the response from meter 114. At step 314, collector 116 stores in memory the meter's 114 unique identifier along with the corresponding RSSI value.

Preferably, collector 116 attempts to register meters 114 that will have a reliable data communication path. Accordingly, at step 316, collector 116 compares the RSSI value of the node scan response with a selected threshold value. For example, the threshold value may be −60 dBm. RSSI values above this threshold are sufficiently reliable. Collector 116 maintains a list of meters 114 that responded but which do not satisfy the RSSI threshold. For example, a database table referred to as the Straggler table may be employed to store for each meter that responded to a Node Scan Response and did not meet the RSSI value, the meter's unique identifier and the RSSI value of the response. Accordingly, if at step 316 the RSSI value is not greater than the established threshold, at step 318, collector 116 updates its list to include the meter's unique identifier and RSSI value. Thereafter, processing continues at step 326.

If at step 316, the RSSI value exceeds the threshold, at step 324, collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. Upon initialization, the data indicates the node is not a repeater and the number of meters for which it operates as a repeater is zero. The registration process further comprises transmitting registration information to the meter 114. For example, collector 116 forwards to meter 114 an indication that it is registered, the unique identifier of the collector with which it is registered, the level the meter exists at in the subnet, and the unique identifier of the meter with which it should communicate data. The meter stores this data and begins to operate as part of the subnet by responding to commands from its collector 116.

At step 326, collector 116 determines if there are additional responses to the node scan request. If so, processing continues at step 314.

Steps 310 through 326 may be performed several times so as to insure that all meters 114 that may receive the Node Scan Procedure, have an opportunity for their response to be received at collector 116. Accordingly, at step 328, collector 116 determines whether the Node Scan should be implemented again. Generally, this is determined by comparing the number of times the steps have been completed with a predefined limit. If the limit has not been met, processing continues at step 310. If the limit has been met, a first portion of the node scan procedure is complete. It is presumed that all first level meters 114 have been identified and registered at this point in the process. The Straggler list may identify one or more meters 114 that did not satisfy the RSSI threshold. The node scan process continues by performing a similar process as that described above at each of the now registered level one nodes. This process results in the identification and registration of level two nodes. After the level two nodes are identified, a similar node scan process is performed at the level two nodes to identify level three nodes, and so on.

FIG. 3B is a flow chart of the process for identifying and registering meters located above the level one meters. At step 340, collector 116 transmits a command, which may be referred to as an Initiate Node Scan Procedure, to the first of the meters 114 registered at steps 310 through 328, to initiate a node scan process at the particular meter 114. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below in connection with FIG. 4, the measure of reliability is employed during a process for identifying more reliable paths for previously registered nodes.

The meter that receives the Initiate Node Scan Response request responds by performing a node scan process similar to that described above at steps 310 through 328. More specifically, the meter broadcasts a request to which all unregistered nodes respond. The request comprises the number of timeslots available for responding nodes (which is used to set the period for the node to wait for responses), the unique address of the collector that initiated the node scan procedure, a measure of the reliability of the communications between the sending node and the collector (which is used in the process of determining whether a meter's path may be switched as defined below in connection with FIG. 5), the level within the subnet of the node sending the request, and an RSSI threshold (which is used in the process of determining whether a registered meter's path may be switched as described below in connection with FIG. 4). The meter issuing the node scan request waits for and receives responses. For each response, the meter stores in memory the unique identifier and the RSSI value of the response. At step 342, collector 116 waits while the response are collected at the meter that issued the node scan. At step 344, collector 116 retrieves the node information that has been collected by the meter. At step 346, collector 116 parses the information and selects one of the meters or potential nodes in the list of retrieved data.

Collector 116 attempts to register meters 114 that will have a reliable data communication path. Accordingly, at step 348, collector 116 compares the RSSI value for the selected meter 114 with a selected threshold value. If the RSSI value is not greater than the threshold value, at step 350, collector 116 determines if the particular meter was previously identified as having responded to a Node Scan Response request but having not met the RSSI threshold. Specifically, collector 116 may refer to its Straggler table or similar file where it maintains a list of meters 114 that meet this criteria. If so, at step 352, collector 116 compares the RSSI value with the previously stored value. If the new RSSI value is greater than the previous value, at step 354, collector updates the Straggler table to identify the new RSSI value and the new communication path. If at step 352, the new RSSI value is not greater than the previous value, processing continues at step 362. If at step 350, it is determined that the particular meter 114 is not in the Straggler table, processing continues at step 354, where the Straggler table is updated to reflect the meter identifier, the communication path to this meter and the RSSI value. Thereafter, processing continues at step 362.

If at step 348, the RSSI value exceeded the threshold, at step 360, collector 116 registers the node. Registering a meter 114 comprises updating a list of the registered nodes at collector 116. For example, the list may be updated to identify the meter's unique identifier and the level of the meter in the subnet, i.e. whether the meter is a level one node, level two node, etc. Additionally, the collector's 116 registration information is updated to reflect that the meter 114 from which the scan process was initiated is identified as a repeater for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node with which it communicates to forward information to collector 116.

At step 362, collector 116 determines if there are additional nodes identified in the information retrieved from the meter 114 that performed the node scan request. If so, processing continues at step 346.

If at step 362, there are no potential nodes to be evaluated, at step 364, collector 116 determines if there are other registered nodes on the same level that have not been directed to perform a node scan. For example, if level 1 nodes are being scanned for potential level 2 nodes, at step 364 collector 116 determines if there are any level 1 nodes that have not yet performed a node scan procedure. If so, processing continues at step 340 wherein collector requests that a node scan procedure be performed at the node.

If at step 364, all nodes at the level of the subnet under evaluation have been reviewed, processing continues at step 368, with collector 116 determining if there are registered meters at the next level of the subnet. If so, processing continues at step 340 with node scans being performed at this next level.

If at step 368 there are no registered nodes at the next higher level, at step 370, collector 116 registers the nodes identified in the list of meters that have responded but did not meet the RSSI threshold. At this point in the process, presumably, the list comprises the best path identified for each of the unregistered meters that responded, even if that path does not meet the desired RSSI threshold. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

Figure 4:
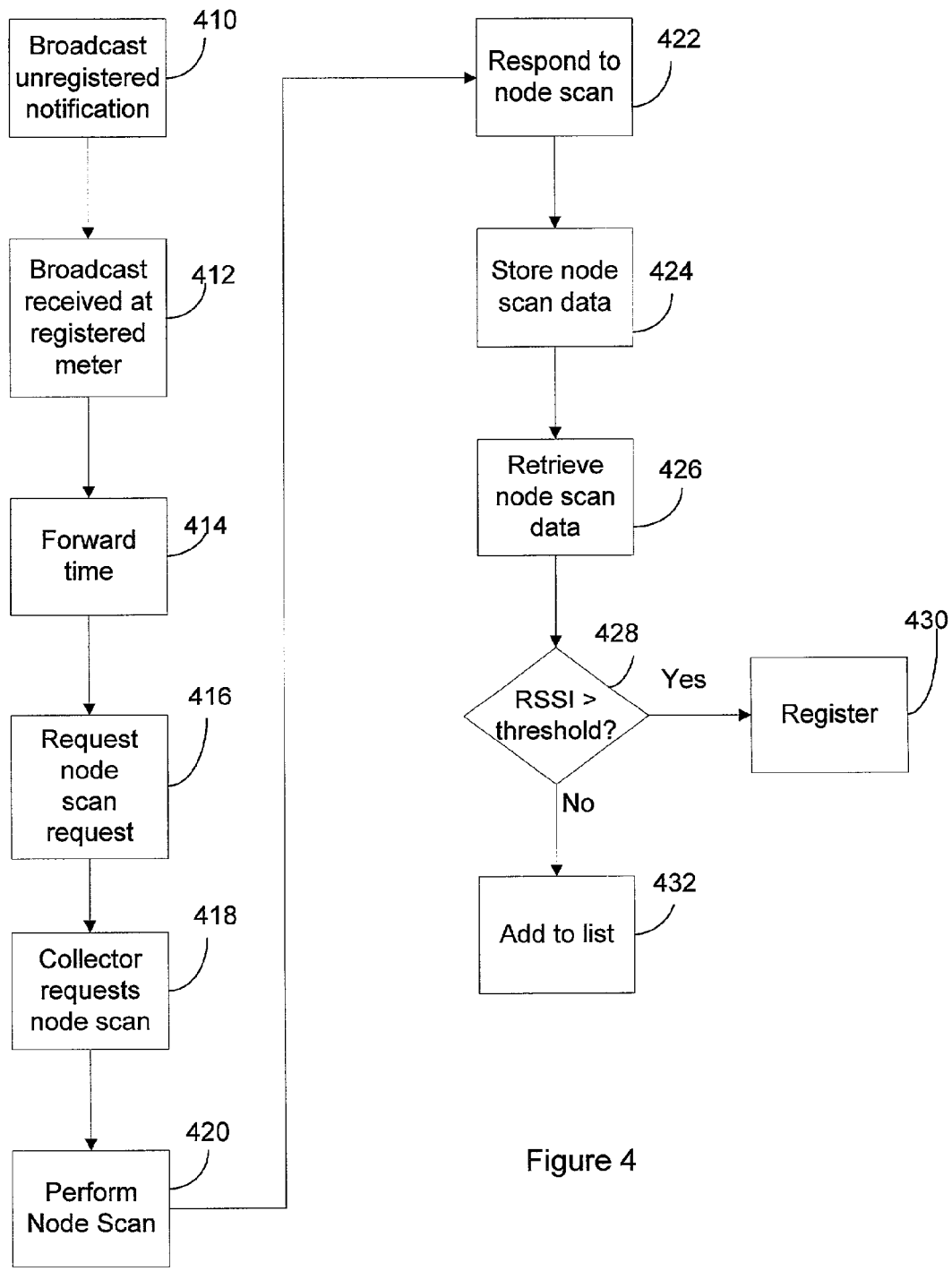
FIG. 4 depicts a flow chart of a process for registering a newly added meter.

According to an aspect of the disclosed embodiment, system 110 automatically reconfigures to accommodate a new meter 114 that may be added. More particularly, the system identifies that the new meter has begun operating and identifies a path to a collector 116 that will become responsible for collecting the metering data. A flow chart of a process for adding a new meter is depicted in FIG. 4. As shown, at step 410, the new meter broadcasts an indication that it is unregistered. In one embodiment, this broadcast might be, for example, embedded in, or relayed as part of a request for an update of the real time as described above. At step 412, the broadcast is received at one of the registered meters 114 in proximity to the meter that is attempting to register. At step 414, the registered meter 114 forwards the time to the meter that is attempting to register. At step 416, the registered node also transmits an exception request to its collector 116 requesting that the collector 116 implement a node scan, which presumably will locate and register the new meter. At step 418, the collector 116 transmits a request that the registered node perform a node scan. At step 420, the registered node performs the node scan during which it requests that all unregistered nodes respond. At step 422, the newly added, unregistered meter responds to the node scan. At step 424, the unique identifier of the newly added node along with the RSSI value of its response are stored on the registered node. At step 426, collector 116 retrieves the response data. If at step 428 the RSSI value of the response from the new meter exceeds the established RSSI threshold, at step 430 collector 116 updates its data files to identify the new meter as being registered and transmits a registration notification to the new meter. If at step 428 the RSSI value does not exceed the threshold, the unique identifier is added to the list of unregistered nodes, at step 432. The newly added meter will continue to broadcast that it is unregistered and ultimately will be registered through a meter with which it satisfies the RSSI threshold.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by collector 116 and keep track of the time since their data has last been collected by the collector 116. If the length of time since the last reading exceeds a defined threshold such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above in connection with FIG. 3. Thus, the exemplary system is operable to dynamically reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired frequency, the collector 116 transmits a message to the meter 114 to respond to node scans going forward. The meter 114 remains registered but will respond to node scans such as are described above in connection with FIG. 3. If the meter 114 responds to a node scan procedure, the collector 116 recognizes the response as originating from a registered meter. The collector 116 verifies that the RSSI value of the node scan response exceeds the established threshold. If it does not, the potential path is not acceptable. However, if the RSSI threshold is met, the collector 116 initiates a qualification procedure whereby it makes several attempts to reach the meter through the potential path. If the collector is successful in establishing communication with the meter through the potential path more than an acceptable percentage of the time, e.g. 80 percent, then the collector registers the meter in the new path. The registration process comprises updating the collector 116 and meter 114 with data identifying the repeater with which the meter 114 will communicate. Additionally, if the repeater is has not previously performed the operation of a repeater, the repeater would need to be updated to identify that it is a repeater. Likewise, the repeater with which the meter previously communicated is updated to identify that it is no longer a repeater for the particular meter 114.

Figure 5:
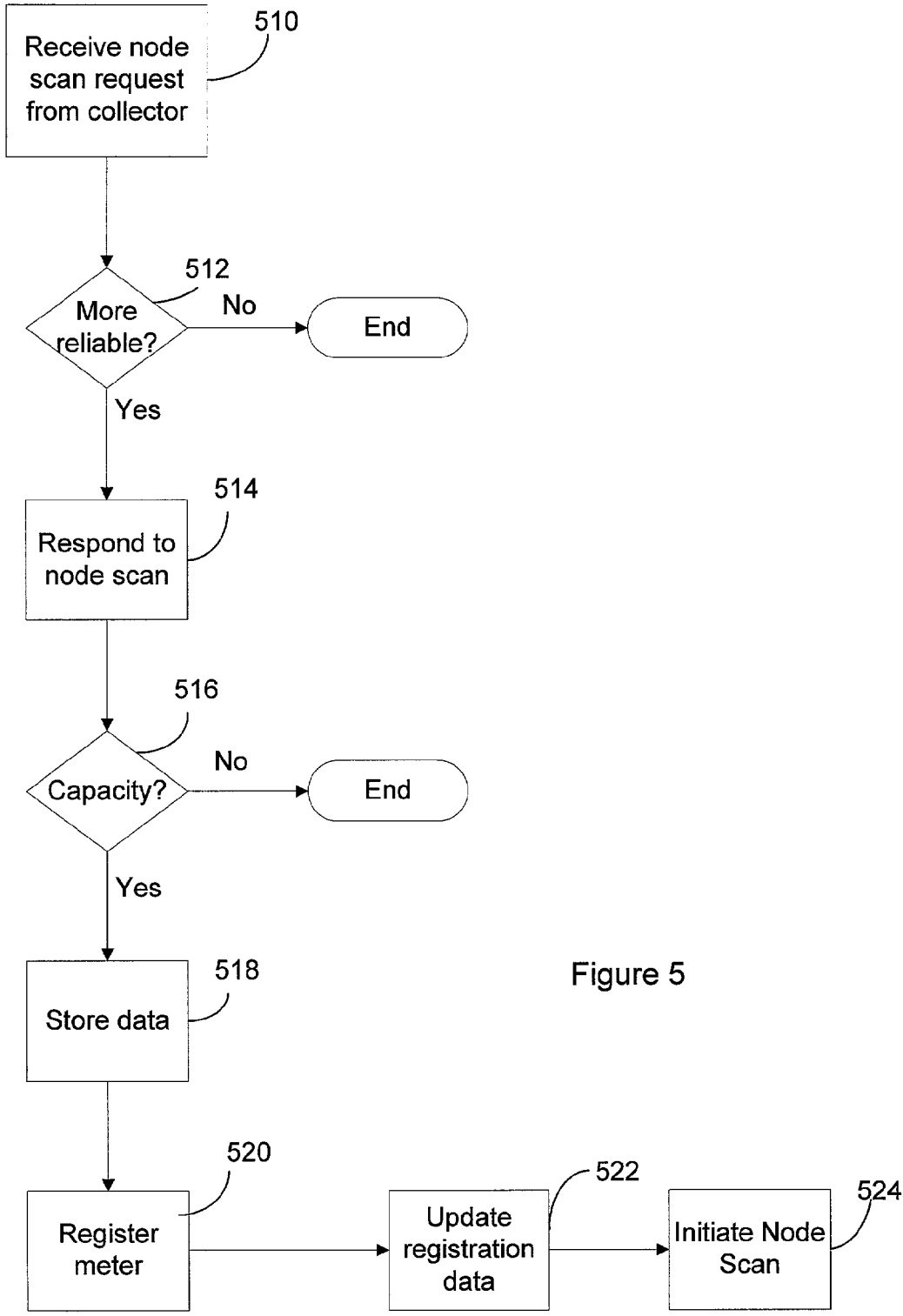
FIG. 5 depicts a flow chart of a process for switching the communication path for a registered node to a new collector.

In some instances, a more reliable communication path for a meter may exist through a collector other than that with which the meter is registered. A meter may automatically recognize the existence of the more reliable communication path, switch collectors, and notify the previous collector that the change has taken place. FIG. 5 provides a flow chart of a method for switching the registration of a meter from a first collector to a second collector. As shown, at step 510, a registered meter 114 receives a node scan request from a collector 116 other than that with which the meter is registered. Typically, a registered meter 114 does not respond to node scan requests. However, if the request is likely to result in a more reliable transmission path, even a registered meter may respond. Accordingly, at step 512, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path is not acceptable and the meter does not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If at step 512, it is determined that the path to the new collector may be better than the path to its existing collector, at step 514, the meter 114 responds to the node scan. Included in the response is information regarding any nodes for which the particular meter may operate as a repeater. For example, the response might identify the number of nodes for which the meter serves as a repeater.

At step 516, collector 116 determines if it has the capacity to service the meter and any meters for which it operates as a repeater. If not, the collector 116 does not respond to the meter that is attempting to change collectors.

If, however, the collector 116 determines that it has capacity to service the meter 5114, at step 518, the collector 116 stores registration information about the meter 114. At step 520, collector 116 transmits a registration command to meter 114. At step 522, the meter 114 updates its registration data to identify that it is now registered with the new collector. At step 524, collector 116 communicates instruction to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning, and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. According to an aspect of the disclosed embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live". During this time to live period, the nodes continue to respond to application layer and immediate s retries allowing the unregistration command to propagate to all nodes in the subnet. Ultimately, the meters register with the replacement collector as described above in connection with FIG. 3.

Figure 6:
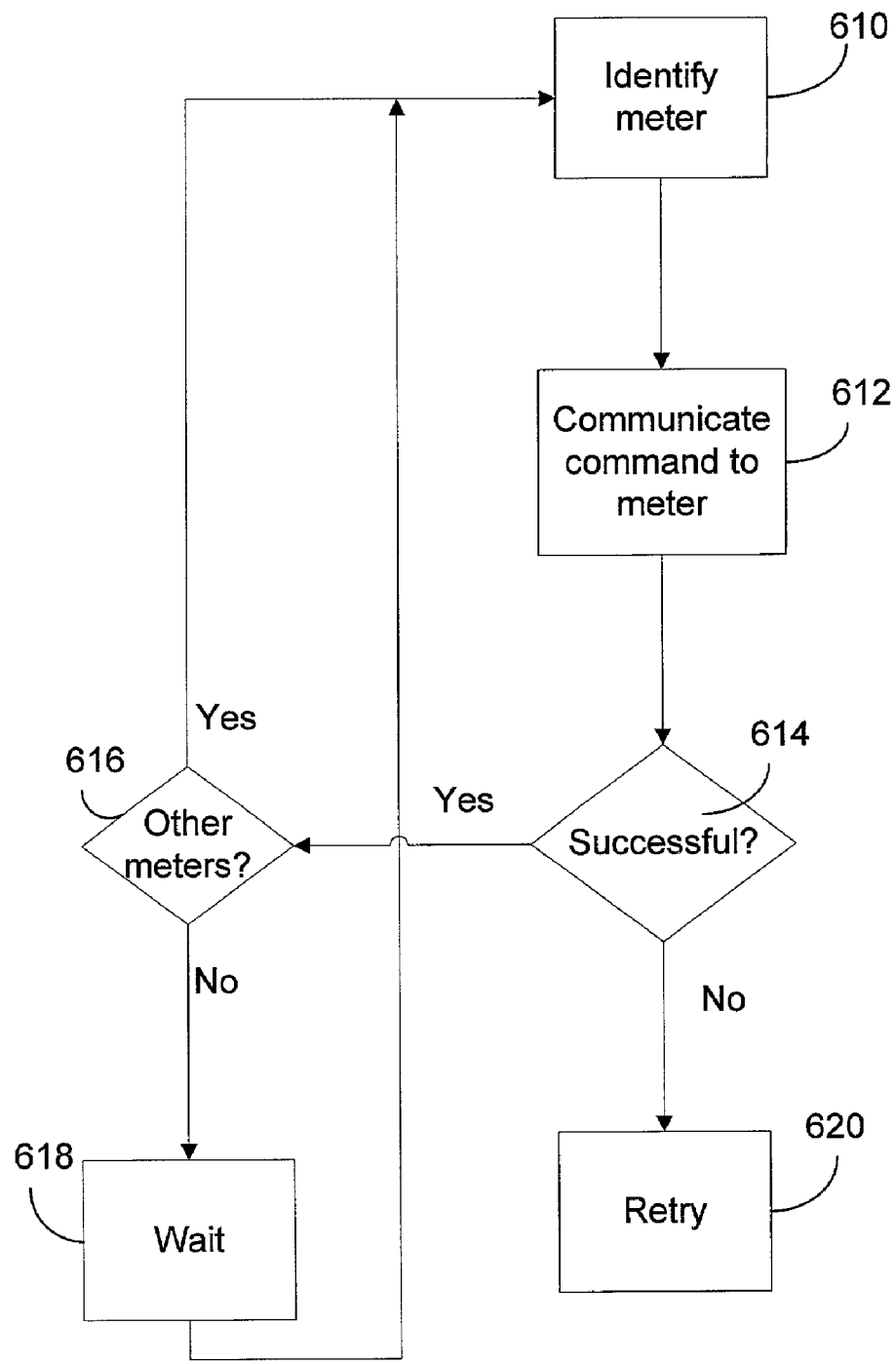
FIG. 6 depicts a flow chart of a process for reading usage data.

One of collector's 116 main responsibilities within subnet 120 is to retrieve metering data from meters 114. The self-configuring and self-healing characteristics of system 110 provide that collectors 116 have improved reliability in reading usage data. Generally, meters 114 store data regarding usage of electricity, gas, water, etc. in memory. Collector 116 periodically retrieves this data from nodes in its subnet 120. In an embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. FIG. 6 depicts a flow chart of a process for retrieving data from meters 114 in a subnet 120. As shown, at step 610, collector 116 identifies one of the meters 114 in its subnet 120. For example, collector 116 reviews a list of registered nodes and identifies one for reading. At step 612, collector 116 communicates a command to the particular meter 114 that it forward its metering data to the collector 116. If at step 614, the meter reading is successful and the data is received at collector 116, at step 616 collector 116 determines if there are other meters that have not been read during the present reading session. If so, processing continues at step 610. However, if all of the meters 114 in subnet 120 have been read, at step 618, collector waits a defined length of time, such as, for example, 4 hours, before attempting another read.

If at step 614, the meter data was not received at collector 116, at step 620 collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

The inability to read metering data may be the result of communication failures that can take place at the packet communication level. For example, if for each hop the probability of successful communications is 95%, a level 8 node requires 16 message hops, which would result in a 44% probability a successful round trip message. If 2 immediate retries are used for each hop, the per hop probability increases from 95% to 99.98% and the probability of a successful round trip message increases to 99.8%. Accordingly, in an embodiment of the disclosed system, with each successive retry to read data from a node, the number of packet level retries increases. For example, if during a normal read attempt one packet level retry is undertaken, when an application level retry to read the data is made by the collector, two or more packet level retries may be implemented. Thus, as the number of application level retries increases, so does the number of packet level retries. Furthermore, the number of packet level retries varies according to the level at which the particular meter 114 exists in the subnet 120. The higher the level, the greater the number of packet level retries. The table below lists exemplary packet level retries for various subnet levels and various numbers of prior application level retry attempts.

|  | Application Layer Attempt | | |
| --- | --- | --- | --- |
|  | 1 | 2 | ≧3 |
| Levels 1 and 2 | 1 | 2 | 3 |
| Levels 3 and 4 | 2 | 3 | 4 |
| Levels 5–6 | 2 | 3 | 4 |
| Levels >6 | 3 | 4 | 5 |

Figure 7:
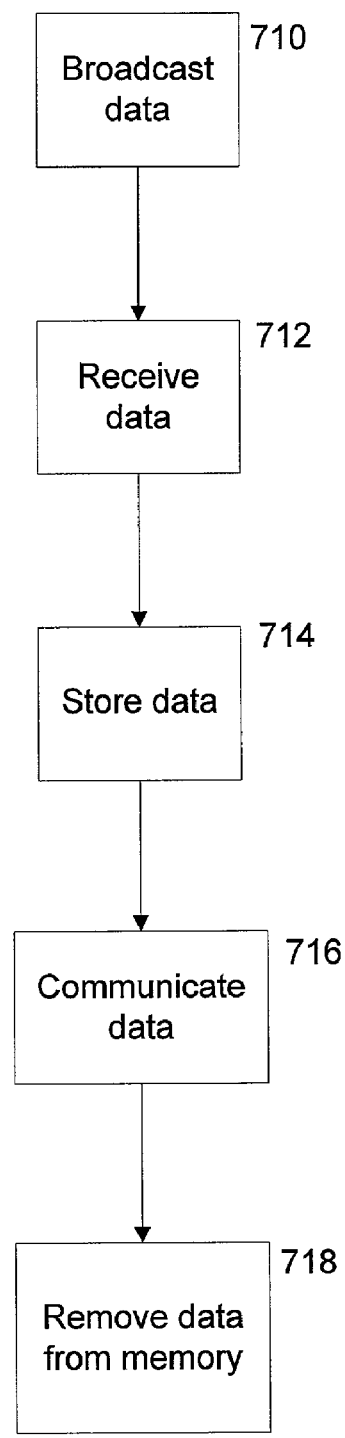
FIG. 7 depicts a flow chart of a process for reading data from a one-way meter.
Figure 8:
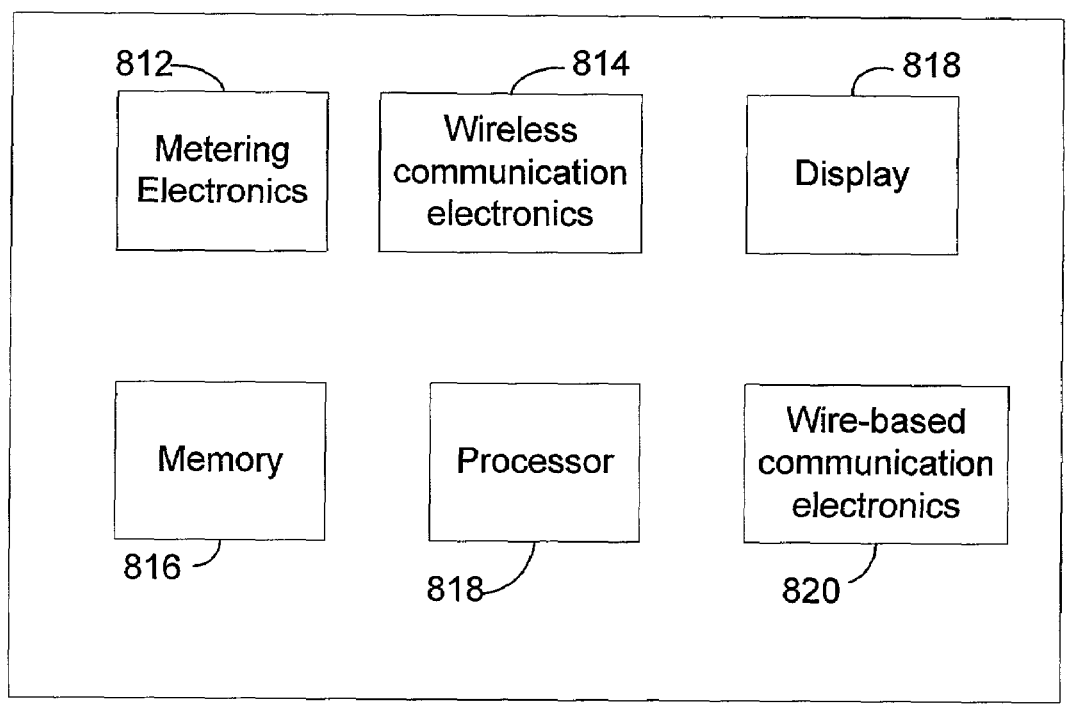
FIG. 8 depicts a block diagram of a meter suitable for use with the disclosed embodiments.

In an embodiment of system 120, meters 114 are typically two-way meters—i.e. they are operable to both receive and transmit data. However, one-way meters that are operable only to transmit and not receive data may also be deployed in the system 110. FIG. 7 provides a flow chart of a process for reading data from one-way meters deployed in the system. As shown, at step 710 a one-way meter broadcasts their usage data. At step 712, this data is received at one or more two-way meters that are in proximity to the one-way meter. At step 714, the data is stored on the two-way meter, and designated as having been received from the one-way meter. At step 716, the data from the one-way meter is communicated to the collector with which the two-way meter is registered. For example, when the collector reads the two-way meter data, it recognizes the existence of meter data from the one-way meter and reads it as well. At step 718, after the data from the one-way meter has been read, it is removed from memory.

A block diagram for an exemplary meter device operable to perform as meter 114 or collector 116 as described above is depicted in FIG. 8. As shown, meter device 810 comprises metering electronics 812 for physically measuring the amount of a service or commodity that is used, and wireless communications electronics 814 for transmitting and receiving data to other meter devices. Device 810 further comprises memory 816 for storing data and executable instructions for performing methods as described above. Processor 818 is operable to execute the instructions stored in memory 816. Device 810 may further comprise visual display 818 for displaying metering data at device 810. Wire-based communications electronics 820 provides the capability to communicate with device 810 via means other than wirelessly. For example, wire-based communications electronics 820 may comprise a modem for communicating over telephone lines or a network protocol transceiver for communicating over a dedicated local area or wide area network.

Figure 9:
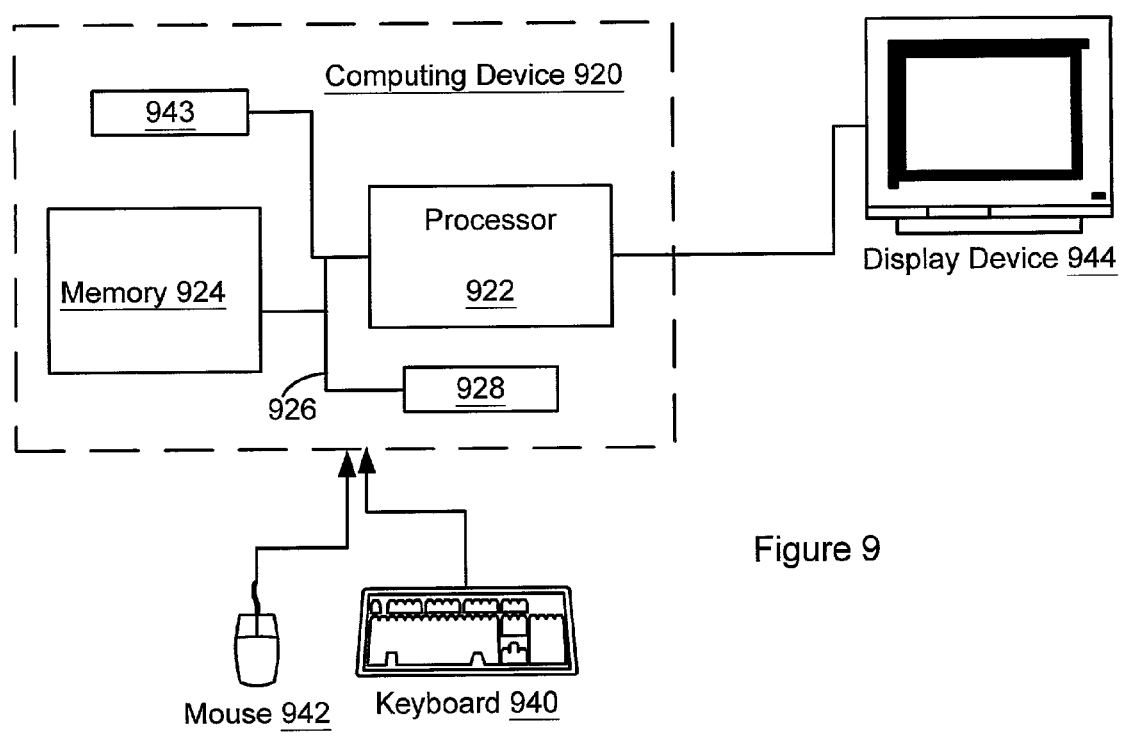
FIG. 9 is a diagram of a general purpose computing device.

FIG. 9 is a diagram of a generic computing device, which may be operable to perform the steps described above as being performed by communications server 122. As shown in FIG. 9, communications server 922 includes processor 922, system memory 924, and system bus 926 that couples various system components including system memory 924 to processor 922. System memory 924 may include read-only memory (ROM) and/or random access memory (RAM). Computing device 920 may further include hard-drive 928, which provides storage for computer readable instructions, data structures, program modules, data, and the like. A user (not shown) may enter commands and information into the computing device 920 through input devices such as keyboard 940 or mouse 942. A display device 944, such as a monitor, a flat panel display, or the like is also connected to computing device 920. Communications device 943, which may be a modem, network interface card, or the like, provides for communications over a network. System memory 924 and/or hard-drive 928 may be loaded with any one of several computer operating systems such as WINDOWS NT operating system, WINDOWS 2000 operating system, LINUX operating system, and the like.

Those skilled in the art understand that processor readable instructions for implementing the above-described processes, such as those described with reference to FIGS. 2 through 7 can be generated and stored in processor-readable memory and processor-readable media such as a magnetic disk or CD-ROM. Further, a computing system such as that described with reference to FIG. 9 may be arranged with metering devices such as that described in FIG. 8, and the devices loaded with processor-readable instructions for performing the above described processes. Specifically, referring to FIGS. 8 and 9, processors 922 and 818 may be programmed to operate in accordance with the above-described processes.

Thus, a dynamic self-configuring system for gathering metering data has been disclosed. This novel system and the methods performed therein provide a reliable and efficient means to collect metering data with minimal human intervention. Furthermore, the system requires minimal human interaction to configure and upgrade efficiencies.

While systems and methods have been described and illustrated with reference to specific embodiments, those skilled in the art will recognize that modification and variations may be made without departing from the principles described above and set forth in the following claims. For example, while communication server 122 has been described as communicating with collectors 116 via a dial-up connection, the communication may take place wirelessly. Accordingly, reference should be made to the following claims as describing the scope of disclosed embodiments.

What is claimed is:

1. A system for collecting metering data, comprising:
    a collector meter, said collector meter comprising electrical circuitry for gathering meter data, wireless communication electronics for sending and receiving data, a processor for implementing instructions, and memory for storing data;
    a first plurality of meters, each meter in said first plurality comprising electrical circuitry for gathering meter data, wireless communications electronics for sending and receiving data, a process for implementing instructions, and memory for storing data;
    a second plurality of meters, each meter in said second plurality comprising electrical circuitry for gathering meter data, wireless communications electronics for sending and receiving data, a process for implementing instructions, and memory for storing data;
    wherein each of said first plurality of meters communicates with said collector meter, is registered in a subnet with said collector meter, and became registered in said subnet after responding to a broadcast request from said collector meter, and
    wherein each of said second plurality of meters communicates with one of said first plurality of meters, is registered in said subnet with said collector meter, and became registered in said subnet after responding to a broadcast request from one of said first plurality of meters.

2. The system of claim 1, wherein said collector meter broadcasts instructions to said first plurality of meters.

3. The system of claim 1, wherein said collector meter communicates with single meters in said first plurality of meters.

4. The system of claim 1, wherein each of said first plurality of meters and said second plurality of meters is operable to forward exception messages to said collector meter.

5. The system of claim 1, wherein said collector meter is operable to communicate flood broadcast messages.

6. The system of claim 1, wherein said collector communicates a time reading to said first plurality of meters, and said first plurality of meters communicate the time reading to said second plurality of meters.

7. The system of claim 1, wherein said first plurality of meters comprises a different number of meters than said second plurality of meters.

8. The system of claim 1, wherein said first plurality of meters comprises at least two meters, and each of said at least two meters communicate data from said collector meter to at least one meter in said second plurality of meters.

9. The system of claim 1, wherein said collector meter and said first and second plurality of meters communicate using frequency hopping spread spectrum procedures.

10. The system of claim 1, wherein communications between said collector meter, said first plurality of meters, and said second plurality of meters comprise application level and packet level retries.

11. The system of claim 10, wherein the number of packet level retries in a communication from a meter is dependent upon the level of the meter in the subnet and the number of prior application level retries.

12. The system of claim 1, further comprising a newly added meter, said newly added meter comprising electrical circuitry for gathering meter data, wireless communications electronics for sending and receiving data, a process for implementing instructions, and memory for storing data;
    wherein said newly added meter communicates with one of said second plurality of meters, is registered in said subnet with said collector meter, and became registered in said subnet after communicating a request to one of said second plurality of meters and responding to a broadcast request from one of said second plurality of meters.

13. The system of claim 1, wherein at least one of said second plurality of meters comprises instructions for seeking a more reliable communication path with said collector meter.

14. The system of claim 1, wherein at least one of said second plurality of meters comprises instructions for identifying a more reliable communication path with a second collector meter and requesting registration with said second collector meter.

15. The system of claim 1, further comprising a one-way meter comprising electronic circuitry for transmitting data, a processor, and memory,
    wherein said one-way meter comprises instructions for broadcasting metering data and at least one of said second plurality of meters comprises instructions for receiving the metering data.

16. The system of claim 1, wherein said collector meter further comprises instructions for determining whether a response signal strength exceeds a defined threshold.

17. A method for configuring a metering network, comprising:
    at a collector meter, broadcasting a request that meters respond;
    at a first meter, receiving the request that meters respond and communicating a response;
    at the collector meter, receiving the response from the first meter;
    at the collector meter, if the signal strength of the response exceeds a threshold, registering the first meter;
    at the collector meter, communicating instructions to the first meter to broadcast a request that meters respond;
    at the first meter, broadcasting a request that meters respond;
    at a second meter, receiving the request that meters respond and communicating a response to the first meter;
    at the first meter storing data identifying the second meter and the signal strength of the response from the second meter;
    at the collector meter, receiving the data identifying the second meter and the signal strength of the response from the second meter; and
    at the collector meter, if the signal strength of the response from the second meter exceeds a defined threshold, registering the second meter.

18. The method of claim 17, wherein registering the first meter comprises:
    at the collector, storing data identifying the first meter; and
    at the first meter, storing data identifying the collector.

19. The method of claim 17, wherein registering the second meter comprises:
    at the collector storing data identifying the second meter and data identifying the first meter as a repeater for the second meter;
    at the second meter, storing data identifying the collector and data identifying the first meter as the repeater for the second meter.

20. The method of claim 19, wherein registering the second meter further comprises at the first meter, storing data identifying the first meter as a repeater for the second meter.

21. The method of claim 17, further comprising:
- at the second meter, receiving a communication that a third meter is operable and unregistered;
- at the second meter, communicating a request to the collector via the first meter to communicate instructions to broadcast a request that meters respond;
- at the collector meter, communicating instructions for the second meter to broadcast a request that meters respond;
- at the second meter, broadcasting a request that meters respond;
- at the third meter, responding to the request that meters respond;
- at the second meter, receiving a response from the third meter uniquely identifying the third meter, and storing data identifying the third meter and a received signal strength of the response from the third meter;
- at the collector meter, receiving data uniquely identifying the third meter and identifying the received signal strength of the response from the third meter; and
- at the collector meter, if the received signal strength is greater than a defined threshold, registering the third meter.

22. The method of claim 21, wherein registering the third meter comprises;
- at the collector meter, storing data identifying the third meter;
- at the third meter, storing data identifying the collector and data identifying the second meter; and
- at the second meter, storing data identifying that the second meter is a repeater.

23. The method of claim 22, further comprising:
- at the second meter, identifying that data has not been retrieve by the collector meter for a period of time exceeding a threshold; and
- at the second meter, broadcasting data indication the second meter is operable and unregistered.

24. The method of claim 17, further comprising:
- at the second meter, receiving a request originating from a second collector meter that all meters respond;
- at the second meter, determining if the second collector meter offers a more reliable communication path with the second meter; and
- at the second meter, if the second collector meter offers a more reliable communication path, responding to the request originating from the second collector meter, the response comprising data identifying the second meter and data identifying the number of meters for which the second meter is a repeater.

25. The method of claim 24, further comprising:
- at the second collector meter, receiving data identifying the second meter and data identifying the number of meters for which the second meter is a repeater;
- at the second collector meter, determining if the second meter has capacity for the second meter and any meters for which the second meter is a repeater;
- if the second collector has capacity, registering the meter.

* * * * *

UNITED STATES PATENT AND TRADEMARK OFFICE
CERTIFICATE OF CORRECTION

| | | |
|---|---|---|
| PATENT NO. | : 7,119,713 B2 | Page 1 of 1 |
| APPLICATION NO. | : 10/185664 | |
| DATED | : October 10, 2006 | |
| INVENTOR(S) | : Kenneth C. Shuey et al. | |

It is certified that error appears in the above-identified patent and that said Letters Patent is hereby corrected as shown below:

Title Page,
Item (56) References Cited, U.S. PATENT DOCUMENTS:
Page 2, "5,475,742" reference, delete "Blum" and insert -- Gilbert --.
Page 2, "5,475,867" reference, delete "Gilbert" and insert -- Blum --.

Column 3,
Line 17, delete "a".

Column 8,
Line 33, delete "response" and insert -- responses --.

Column 11,
Line 21, delete "is".

Column 12,
Line 2, after "collectors." insert next sentence -- If, however, the collector 116....--.
There should not be a new paragraph here.
Line 4, delete "5114," and insert -- 114, --.

Column 13,
Line 39, delete "$\geqq 3$" and insert -- $\geq 3$ --.

Column 18,
Line 6, delete "retrieve" and insert -- retrieved --.

Signed and Sealed this

First Day of May, 2007

JON W. DUDAS
*Director of the United States Patent and Trademark Office*